United States Patent
Rosenberg et al.

(10) Patent No.: US 8,745,141 B2
(45) Date of Patent: Jun. 3, 2014

(54) CALENDAR EVENT, NOTIFICATION AND ALERT BAR EMBEDDED WITHIN MAIL

(75) Inventors: Gregory A. Rosenberg, San Mateo, CA (US); Gregory J. Armanini, Mountain View, CA (US); Ethan H. Diamond, San Francisco, CA (US); Andrew T. Garcia, San Francisco, CA (US)

(73) Assignee: Yahoo! Inc., Sunnyvale, CA (US)

(*) Notice: Subject to any disclaimer, the term of this patent is extended or adjusted under 35 U.S.C. 154(b) by 1182 days.

(21) Appl. No.: 11/500,766

(22) Filed: Aug. 7, 2006

(65) Prior Publication Data

US 2008/0034047 A1 Feb. 7, 2008

(51) Int. Cl.
G06F 15/16 (2006.01)

(52) U.S. Cl.
USPC ........... 709/206; 709/204; 709/205; 709/207; 715/752; 715/769

(58) Field of Classification Search
USPC ........... 709/206, 205, 207, 204; 715/752, 769
See application file for complete search history.

(56) References Cited

U.S. PATENT DOCUMENTS

| | | | |
|---|---|---|---|
| 5,129,057 A | | 7/1992 | Strope et al. |
| 5,864,848 A | * | 1/1999 | Horvitz et al. ........................ 1/1 |
| 6,580,787 B1 | | 6/2003 | Akhteruzzaman et al. |
| 6,636,888 B1 | * | 10/2003 | Bookspan et al. ............ 709/203 |
| 6,714,932 B1 | | 3/2004 | Takeda et al. |
| 7,788,589 B2 | | 8/2010 | Frankel et al. |
| 2002/0118168 A1 | * | 8/2002 | Hinckley et al. .............. 345/163 |
| 2002/0188607 A1 | | 12/2002 | Kogut-O'Connell et al. |
| 2002/0194379 A1 | * | 12/2002 | Bennett et al. ................ 709/246 |
| 2003/0167310 A1 | * | 9/2003 | Moody et al. ................ 709/206 |
| 2003/0222765 A1 | | 12/2003 | Curbow et al. |
| 2004/0243677 A1 | * | 12/2004 | Curbow et al. ............... 709/206 |

(Continued)

FOREIGN PATENT DOCUMENTS

| | | |
|---|---|---|
| JP | 11-296486 | 10/1999 |
| JP | 2000-163383 | 6/2000 |

(Continued)

OTHER PUBLICATIONS

Julia A. Black et, al., Automated Event Extraction from Email Jun. 2, 2004 nlp.stanford.edu/courses/cs224n/2004/jblack-final-report.pdf.
*

(Continued)

*Primary Examiner* — Harunur Rashid
(74) *Attorney, Agent, or Firm* — Hickman Palermo Truong Becker Bingham Wong LLP

(57) ABSTRACT

A compact functionally rich timeline bar is embedded within an e-mail application window so that time-related information, such as calendar events, can be viewed and managed from within the e-mail window. The timeline bar consumes a small area of the e-mail window while presenting an optimal amount of information without interfering with the primary tasks regarding the e-mail application. The timeline bar displays as much of a string of calendar events as will fit in the timeline bar, and presents mechanisms with which a user can scroll forward and backward through the string of calendar events and can jump to particular dates within the string of events. Various presentations and operations are provided when a user hovers over corresponding features of the timeline bar, and various "drag-and-drop" operations are provided to initiate calendar event scheduling when a user drags-and-drops entities from other applications onto a feature of the timeline bar.

30 Claims, 4 Drawing Sheets

(56) References Cited

U.S. PATENT DOCUMENTS

| | | | |
|---|---|---|---|
| 2005/0057584 A1* | 3/2005 | Gruen et al. | 345/752 |
| 2005/0149858 A1* | 7/2005 | Stern et al. | 715/513 |
| 2005/0289202 A1 | 12/2005 | S et al. | |
| 2006/0241952 A1* | 10/2006 | Loduha | 705/1 |
| 2007/0073810 A1* | 3/2007 | Adams et al. | 709/205 |
| 2007/0129880 A1* | 6/2007 | Thacher | 701/202 |
| 2007/0136466 A1* | 6/2007 | Etelapera | 709/225 |
| 2007/0192708 A1* | 8/2007 | Lee et al. | 715/752 |
| 2007/0244976 A1* | 10/2007 | Carroll et al. | 709/206 |
| 2009/0100347 A1* | 4/2009 | Schemers et al. | 715/751 |

FOREIGN PATENT DOCUMENTS

| | | |
|---|---|---|
| JP | 2004-260864 | 9/2004 |
| JP | 2005-196493 | 7/2005 |
| JP | 2006-042199 | 2/2006 |
| JP | 2006-081129 | 3/2006 |
| JP | 2006-113744 | 4/2006 |
| KR | 1020050097741 | 10/2005 |
| KR | 10 2006 0025291 | 3/2006 |

OTHER PUBLICATIONS

Mia K. Stern el al, Dates and Times in Email Messages, Proceeding IUI '04 Proceedings of the 9th international conference on Intelligent user interfaces pp. 328-330 ACM New York, NY, USA © 2004 table of contents ISBN:1-58113-815-6.*

Notification of Transmittal of the International Search Report and the Written Opinion of the International Searching Authority, or the Declaration received in corresponding International application No. PCT/US2007/075027 dated Jan. 8, 2008.

South Korean Application No. 10-2009-7002503 "KIPO's Notice of Preliminary Rejection", English Translation, Oct. 11, 2010, 4 pages.

Current Claims, South Korean Application No. 10-2009-7002503, 3 pages.

South Korean Application No. 10-2009-7002503 Final Office Action, English Translation, Applicant: Yahoo! Inc., dated Apr. 1, 2011 (5 pages).

Current Claims, South Korean Application No. 10-2009-7002503, Applicant: Yahoo! Inc., dated Apr. 2011 (3 pages).

Japanese Application No. 2009-523905 Office Action, Applicant: Yahoo! Inc., dated Apr. 27, 2011 (3 pages).

Current Claims, Japanese Application No. 2009-523905, Applicant: Yahoo! Inc., dated Apr. 2011 (4 pages).

English translation of "Intra-Net Created with Group Ware", Networking Computing, Oct. 1, 1996 (1 page).

State Intellectual Property Office of the People's Republic of China, "First Office Action" in Chinese Patent Application No. 200780029198.4 English Translation, Applicant: Yahoo! Inc., Dated Apr. 20, 2011, 5 pages.

Current Claims, Chinese Patent Application No. 200780029198.4, Applicant: Yahoo! Inc., dated Apr. 2011, 2 pages.

European Patent Office, Search Report with Written Opinion, in application No. 07813681.9-1238, dated Jul. 28, 2011, 8 pages.

Current Claims in application No. 07813681.9-1238, dated Jul. 2011, 3 pages.

Japanese Office Action received in International application No. 2009-523905 dated Aug. 31, 2011 (4 pages).

Japanese Current Claims received in International application No. 2009-523905 dated Aug. 2011 (3 pages).

Japanese Office Action 2009-523905: "Integrated Information management tool—Agenda-" for displaying schedule on a display in lightning board, JRL http://www.forest.impress.co.jp/article/2001/05/15agendalhtml (Reference date: Aug. 26, 2001)—1 page.

Japanese Office Action 2009-523905: "Agenda—A tool of managing multi information where schedule and TO-Do List are displayed on a lighting board," URL http://www.vector.co.jp/magazine/softnews/010217/n010217.html (Reference date: Aug. 26, 2001) (5 pages).

Japanese Laid-Open Patent Application Publication JP2006-065860A, English abstract (1 page).

Chinese Office Action received in International application No. 200780029198.4 dated Apr. 12, 2012 (5 pages).

Chinese Current Claims received in International application No. 200780029198.4 dated Apr. 2012 (2 pages).

* cited by examiner

US 8,745,141 B2

CALENDAR EVENT, NOTIFICATION AND ALERT BAR EMBEDDED WITHIN MAIL

FIELD OF THE INVENTION

The present invention relates to integration of functionality among software applications and, more particularly, to a calendar event, notification, and alert bar embedded within an electronic mail window.

BACKGROUND OF THE INVENTION

Use of web-based applications has become prevalent as use of the World Wide Web has evolved. In fact, for some classes of applications, use of web-based applications instead of desktop applications has become very common for many users. For example, many users have switched from desktop electronic mail (e-mail) applications and desktop calendar applications to web-based e-mail applications and web-based calendar applications.

However, even these different web-based applications have remained mostly independent from, and unintegrated with, each other. Thus, users are required to manually toggle from one application to another application when needing information from different applications. For example, while working within an e-mail application window, a user has to move to another application window to work with a calendar application, e.g., in order to access calendar information. Similarly, the user has to then move back to the e-mail window to continue working with the e-mail application. For some users, changing back and forth among application windows may be required many times during a given user session, which can be a cumbersome and certainly interruptive process.

In view of the foregoing, there is a need for more and better integration among different software applications so that users can create, view, edit and generally manage information associated with one application while working within another different application.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Techniques are described for integrating various software applications and associated functionality so that information from one application can be viewed and managed from within another different application without having to actively move to a different window associated with the one application. For example, using the described techniques, a user could view and manage calendar information from within an e-mail application window.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview of Embodiments

A compact and functionally rich timeline bar is embedded within an e-mail application window so that time-related information, such as calendar events, can be viewed and managed from within the e-mail application window. The timeline bar consumes a small area of the e-mail window while presenting an optimal amount of information without interfering with the primary tasks concerning the e-mail application.

According to embodiments, the timeline bar displays as much of a continuous string of calendar events as will fit in the compact timeline bar, and presents mechanisms with which a user can scroll forward and backward through the continuous string of calendar events and can jump to particular dates within the string of events. Furthermore, various presentations and operations are provided when a user hovers over corresponding features of the timeline bar, and various "drag-and-drop" operations are provided to initiate calendar event scheduling when a user drags-and-drops objects from other applications onto a feature of the timeline bar.

Generally, the timeline bar can be used to integrate, present, and/or manage information from many different applications from within the e-mail application window. For non-limiting examples, the timeline bar space can be used to momentarily present calendar event reminders, calendar event invitations, instant messaging notifications, system alerts, and the like.

A Timeline Bar Embedded within an E-Mail Application Window

Figure 1:
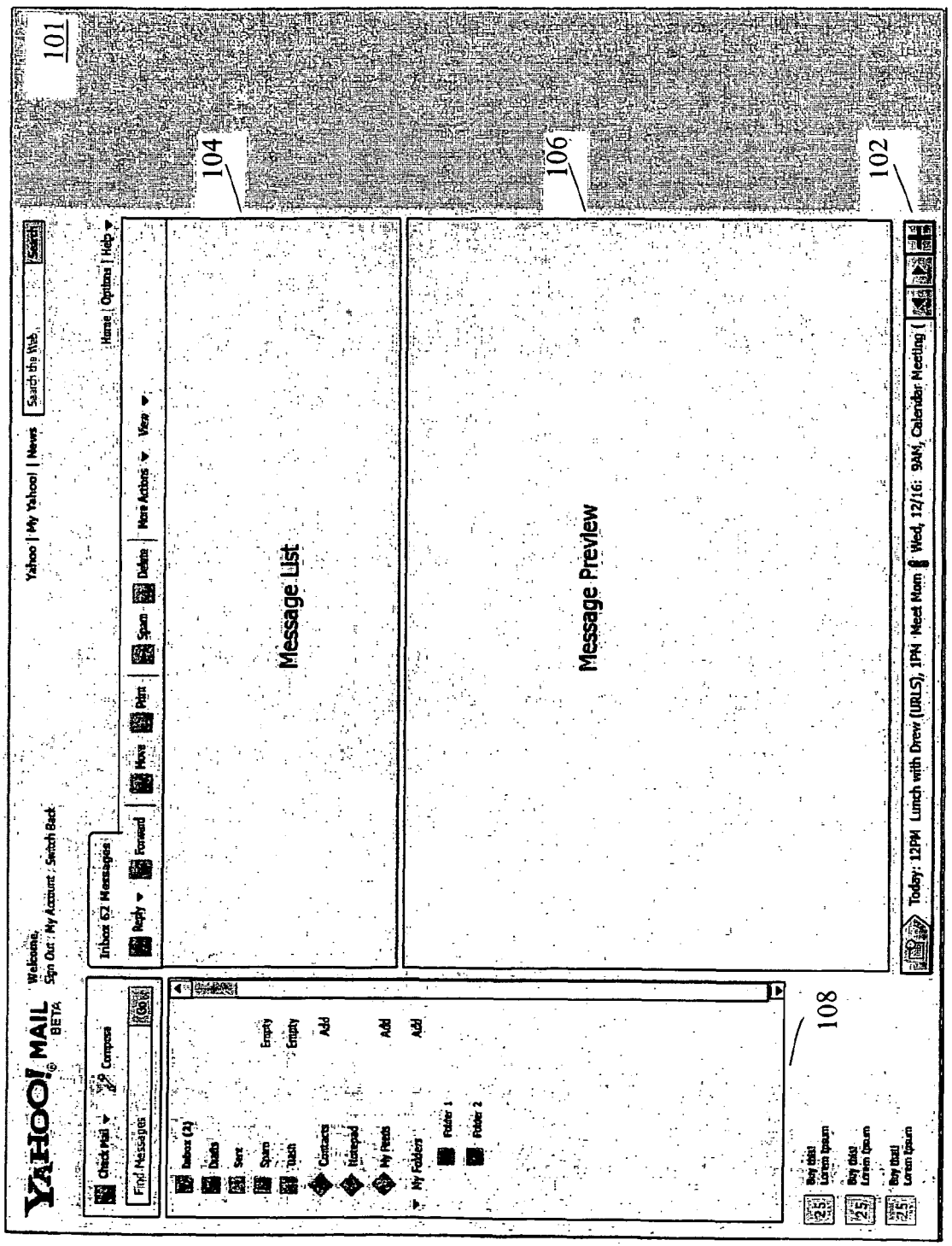
FIG. 1 is a diagram that illustrates a screenshot of an e-mail application window having an embedded timeline bar, according to an embodiment of the invention.

FIG. 1 is a diagram that illustrates a screenshot of an e-mail application window having an embedded timeline bar, according to an embodiment of the invention.

FIG. 1 illustrates an electronic mail application window 101 (hereafter "e-mail window"), such as a web browser window displaying information associated with an e-mail application. The e-mail window 101 includes a message list pane 104, a message preview pane 106, and a navigation pane 108, all of which are presented herein as a non-limiting example of a layout for an e-mail window.

According to one embodiment, embedded within e-mail window 101 is a timeline bar 102. Significantly, the timeline bar 102 is a compact and functionally rich information presentation, access, and management (e.g., adding, deleting, editing) mechanism embedded within e-mail window 101. The timeline bar 102 consumes a small area of the e-mail window 101 while presenting an optimal amount of information without interfering with the primary tasks that a user might want to perform with the e-mail application, e.g., reading, composing, and generally managing e-mails. According to one embodiment, timeline bar 102 is laid out near the bottom of e-mail window 101, which is an unobtrusive location for the timeline bar 102.

According to one embodiment, timeline bar 102 may be user-configured (a) to always be shown when the user's personal mail application configuration is in use, or (b) to only appear when the user moves a cursor over the bottom portion of the e-mail window 101, whereby the timeline bar 102 disappears in response to the cursor being moved away from this area. According to one embodiment, the timeline bar 102 is such that users are allowed to position a cursor anywhere over the timeline bar 102 and click/hold and drag the timeline bar 102 to another location within the mail window. Thus, the click/hold and drag action with the timeline bar 102 unanchors the timeline bar 102 and allows it to be positioned and anchored elsewhere within the mail window.

Layout of Timeline Bar

Figure 2:
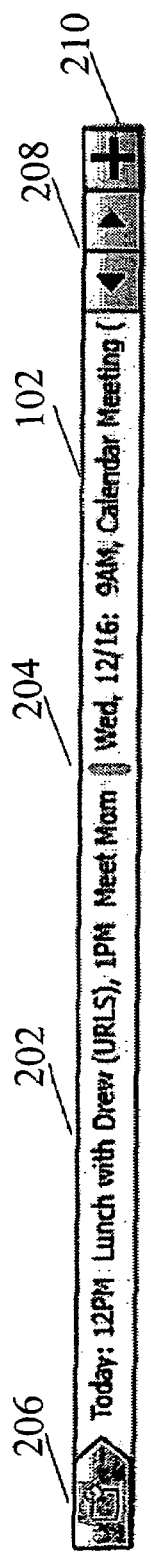
FIG. 2 is a diagram that illustrates a timeline bar, according to an embodiment of the invention.

FIG. 2 is a diagram that illustrates a timeline bar, according to an embodiment of the invention. According to one embodiment, timeline bar 102 comprises content area 202, day separator 204, navigator icon 206, next/previous controls 208, and add event control 210, each of which is described in greater detail herein.

Content Area

According to one embodiment, the content area 202 displays a portion of a string of calendar events (hereafter "events"), where the calendar event information displayed is associated with or originates from an associated calendar application or module and represents an event stored in association with the calendar application or module. For example, the date, time, and title for the event is displayed in the content area 202 for each calendar event displayed. As much information as will fit in content area 202 is displayed at any given time and, according to one embodiment, adjacently displayed days are separated by day separator 204. FIG. 2 illustrates day separator 204 as a vertical bar separating "Today" from "Wed., 12/16". However, the graphics used for day separator 204 may vary from implementation to implementation.

In addition, when there are days or range of days without calendar events, those are collapsed to provide information to the user that there are no events, without cluttering the content area 202 with continuous strings of "No Events". For example, if there is an event on "Wed, 8/2", no event for "Thurs, 8/3", and an event for "Fri, 8/4", then "No Events" (or a similar message) is displayed in the content area 202 for "Thurs, 8/3". If, however, there are no calendar events for Thursday-Friday (or Thursday-Saturday, etc.), a single "No Event" entry (or a similar message) is displayed in content area 202 for that block of days, e.g., "Thurs, 8/3-Fri, 8/4: No Events".

According to one embodiment, the timeline bar 102 is time-sensitive for displaying relevant content, because the content displayed in the content area 202 is automatically refreshed based on the current time. For example, if the current time is 12:30 PM, then content area 202 would display events whose scheduled time extends to 12:30 PM and possibly later. If there are no scheduled events to display relevant to the current time, then content area 202 may be configured to display a message indicating that there are no events to display, and the message may further include instructions as to how to initiate creation of a event, such as by clicking on the add event control 210 as described herein.

According to one embodiment, a specialized icon is used specifically in association with, and only for, repeating events (e.g., for repeating weekly or monthly events). Thus, it is apparent to users that events associated with the specialized icon are repeating events. According to one embodiment, that specialized icon only appears when hovering over a repeating event in the content area 202. Furthermore, other specialized icons can be used to identify corresponding special events. For example, birthday events (a special type of repeating event that many users enter into a calendar application) appear in the content area 202 with a birthday icon of some type (e.g. a cake).

According to one embodiment, clicking on a day or date displayed in the content area 202 causes a link to be followed to the associated calendar application or module from which the information displayed in timeline bar 102 originates. For example, clicking on "Today" links to a calendar window (e.g., an inline layer) that lists calendar events for the current day, and possibly from which such information can be updated or otherwise managed. Similarly, clicking on any displayed dates other than the current day links to a calendar window (e.g., an inline layer) that lists calendar events for the selected date, and possibly from which such information can be updated or otherwise managed.

According to one embodiment, clicking on a calendar event displayed in the content area 202 causes a link to be followed to the associated calendar application or module from which the information displayed in timeline bar 102 originates. For example, clicking on "Meet Mom" links to a calendar window (e.g., an inline layer) in which detail information about that particular event is displayed, from which such information can be updated or otherwise managed.

Content area 202 provides rich "hover capabilities", a term referring to operations that are performed in response to a user hovering the cursor over certain areas of the timeline bar 102, such as the content area 202. According to one embodiment, hovering the cursor over a date displayed in the content area 202 (e.g., hovering over "Today" or "Wed, 12/16" in content area 202 of FIG. 2) causes display of a list of events for that date, i.e., the user's calendar schedule for that date is displayed in a small presentation area overlaying a portion of the main e-mail window. This type of hover presentation area is often referred to as a dynamic or interactive "hovertip" (used hereafter) or "tooltip". Likewise, when the cursor is moved away from over the date, the hovertip disappears.

According to one embodiment, hovering the cursor over a calendar event displayed in the content area 202 (e.g., hovering over "1 PM Meet Mom" in content area 202 of FIG. 2) causes display of details about that event in a small hovertip overlaying a portion of the main e-mail window. Likewise, when the cursor is moved away from over the date, the hovertip disappears. For non-limiting examples, calendar event details displayed in response to hovering over an event may include (a) contact information for a person associated with the calendar event, which may include a picture or avatar associated with the person; (b) notes that the user may have entered in association with the calendar event; (c) map information associated with the calendar event, such as a map display of an address location (and the surrounding area) included in the event details, and the like.

The event detail information that is displayed in response to hovering over an event displayed in the content area 202 may be retrieved from any other associated applications and pulled into a hovertip overlaying a portion of the main e-mail window. For non-limiting examples, information may be retrieved for display from elsewhere in the e-mail application, from the calendar application (including from other users' calendars if configured to share such information), from an instant messaging application, from a map application, and the like. Furthermore, the event detail information displayed can be clicked on to link to the origin of the information, e.g., (a) link to a contact information management mechanism upon clicking on the contact information for the person associated with the event; (b) link to the map application upon clicking on a displayed map and/or when clicking on a displayed address associated with a meeting location for the event; and (c) link to an instant messaging application upon clicking on an instant messaging username displayed in the contact information for the person associated with the event; etc.

Any day or date displayed in the content area 202 is a valid drop zone for drag-and-drop functionality, whereby dropping an object onto the displayed day or date initiates addition of a new calendar event into the calendar application or module. Dragging an object onto the day or date not only initiates addition of a new event, but also opens an add new event tool and pre-fills some information from the object into the new event, according to one embodiment. Dragging and dropping an e-mail having parsable content onto a valid drop zone causes some parsed information to be automatically inserted into the new event. For example, an e-mail title (e.g., "party at tim's next Wednesday") may be used as the title for the corresponding new calendar event. For another example, dragging and dropping a contact from an e-mail application contact feature (e.g., contact "Joe User") onto a valid drop zone causes initiation of a new calendar event, in which the corresponding new calendar event is entitled "<Event> with Joe User". For another example, dragging and dropping an RSS (generally, "Really Simple Syndication") feed posting onto a valid drop zone causes initiation of a new calendar event, in which the corresponding new calendar event is entitled based on the title of the posting.

According to one embodiment, the content area 202 allows users to position a cursor over the content area 202 and click/hold and drag the content displayed in the content area 202, which operates much like a scrolling function. For example, if the user performs a click/hold/drag action on the Wed. 12/16 event content (from right side of content area 202) and drags to the left of content area 202, the entire content in content area 202 will scroll to the left (including moving the Wed. 12/16 content now to the left side of content area 202).

Navigator Icon

According to one embodiment, timeline bar 102 includes a navigator icon 206, which a user can use to select a date at which the calendar event information displayed in the content area 202 begins. According to one embodiment, clicking on the navigator icon 206 opens a calendar window (e.g., an inline layer) displaying a calendar for the current month, from which the user can click a specific date in order to display calendar events for that date in the content area 202. Alternatively, once the calendar window is opened via the navigator icon 206, clicking on a specific date opens an add event dialog box with the specific date selected. Further, within the calendar window is a mechanism for the user to scroll to other months, which causes display of respective month calendars from which a specific date can be selected via clicking on the specific date in the displayed month calendar.

Navigator icon 206 also provides rich hover capabilities in response to a user hovering the cursor over certain areas of the calendar window that is opened in response to clicking on the navigator icon 206. According to one embodiment, hovering the cursor over a date displayed in the calendar window causes display of an event list for that date, i.e., the user's calendar schedule for that date is displayed in a small hovertip overlaying a portion of the main e-mail window. Likewise, when the cursor is moved away from over the date, the hovertip disappears. In this hovertip, the user can also click an "Add Event" button (or a similar interactive feature) to open an add event dialog box for use in adding an event for that day. According to one embodiment, if an event listed in the event list is clicked on, then an edit window (e.g., an inline layer) is opened, from which the clicked event can be edited. According to one embodiment, along with displaying a list of events for the date over which the cursor hovers, weather information is displayed for that date if available, e.g., a feed from a weather application is displayed for the user's local area. Similarly, if the cursor hovers over an event from the event listing, where the event has an address associated with the event, then weather information associated with that address may be displayed.

Controls

According to one embodiment, timeline bar 102 is configured with next/previous controls 208, for controlling what is currently displayed in content area 202. As depicted in FIG. 2, the previous control is implemented as a left arrow and used to move backward in time relative to the string of calendar events currently displayed in content area 202. Similarly, the next control is implemented as a right arrow and used to move forward in time relative to the string of calendar events currently displayed in content area 202. The icons displayed for next/previous controls 208 may vary from implementation to implementation. Each control causes at least some of the information currently displayed in the content area 202 to be replaced with either previous or next information in the string, depending on which control is exercised. Controls 208 could be implemented to replace the entire information currently displayed in the content area 202 with previous or next information in the string, or could be implemented to continuously scroll in either direction in the string of calendar events while the control is being exercised.

According to one embodiment, the next/previous controls 208 support speed sensitivity. With speed sensitivity, the longer the user holds down the mouse button on those buttons, the faster the timeline will move.

According to one embodiment, timeline bar 102 is configured with an add event control 210, for opening up an add event dialog (e.g., an inline layer of the e-mail window) for use in adding new calendar events to the calendar application or module. As depicted in FIG. 2, the add event control 210 is implemented as a plus sign ("+"). However, the icon displayed for the add event control 210 may vary from implementation to implementation.

The add event control 210 is also a valid drop zone for drag-and-drop functionality, whereby dropping an object onto the add event control 210 initiates addition of a new calendar event into the calendar application or module. Generally, natural language parsing is used for adding new calendar events, by parsing whatever object is dropped onto the add event control 210 and automatically filling in whatever information is deemed appropriate for the new calendar event, e.g., contact name, meeting location address, meeting date and time, etc. For example, smart date parsing may be used to determine a date for the new calendar event, whereby (a) if the user has dragged an e-mail onto the add event control 210, then a date for the new calendar event is determined from the parsed information, and (b) if the user has dragged an e-mail to a specific date in the timeline bar 102, then that date is used for the new calendar event and the time is determined from the parsed information.

According to one embodiment, a background routine automatically parses a highlighted e-mail and determines whether the e-mail includes information appropriate for a new calendar event. According to one embodiment, in response to determining that the e-mail includes information appropriate for a new calendar event, the routine causes the add event control 210 to change in such a way as to indicate or hint to the user that a new calendar event could be created based on the e-mail. For non-limiting examples, the add event control 210 could be made to pulse, or change colors, or change to a bold icon, and the like.

According to one embodiment, the add event dialog box that is invoked via the add event control 210 is configured for managing calendar event-based reminders. The add event dialog tool provides options for sending calendar event reminders via, for example, e-mail, mobile phone or other mobile device, instant messaging system, and the like. Furthermore, implementations of the add event dialog tool that is invoked via the add event control 210 may be configured for managing invitations to events, managing recurring events, and managing other time-based information and events originating from various online service offerings.

Presenting Reminders via the Timeline Bar

According to one embodiment, the screen area consumed by the timeline bar 102 is at times used for displaying reminders, notifications, alerts, and the like, all of which are generally referred to herein as "reminders". When this reminder feature is enacted, a reminder momentarily slides over the timeline bar 102 (e.g., for a few seconds) to present some time-based information, and then slides back away. Non-limiting types of reminders that are momentarily presented over the timeline bar include (a) reminders regarding a user's impending calendar events; (b) notifications when someone from the user's instant messaging address book signs into the instant messaging system; (c) alerts regarding system resources, such as that the e-mail server is being taken offline; etc.

Presenting Calendar Information Embedded within E-Mail Window

Figure 3:
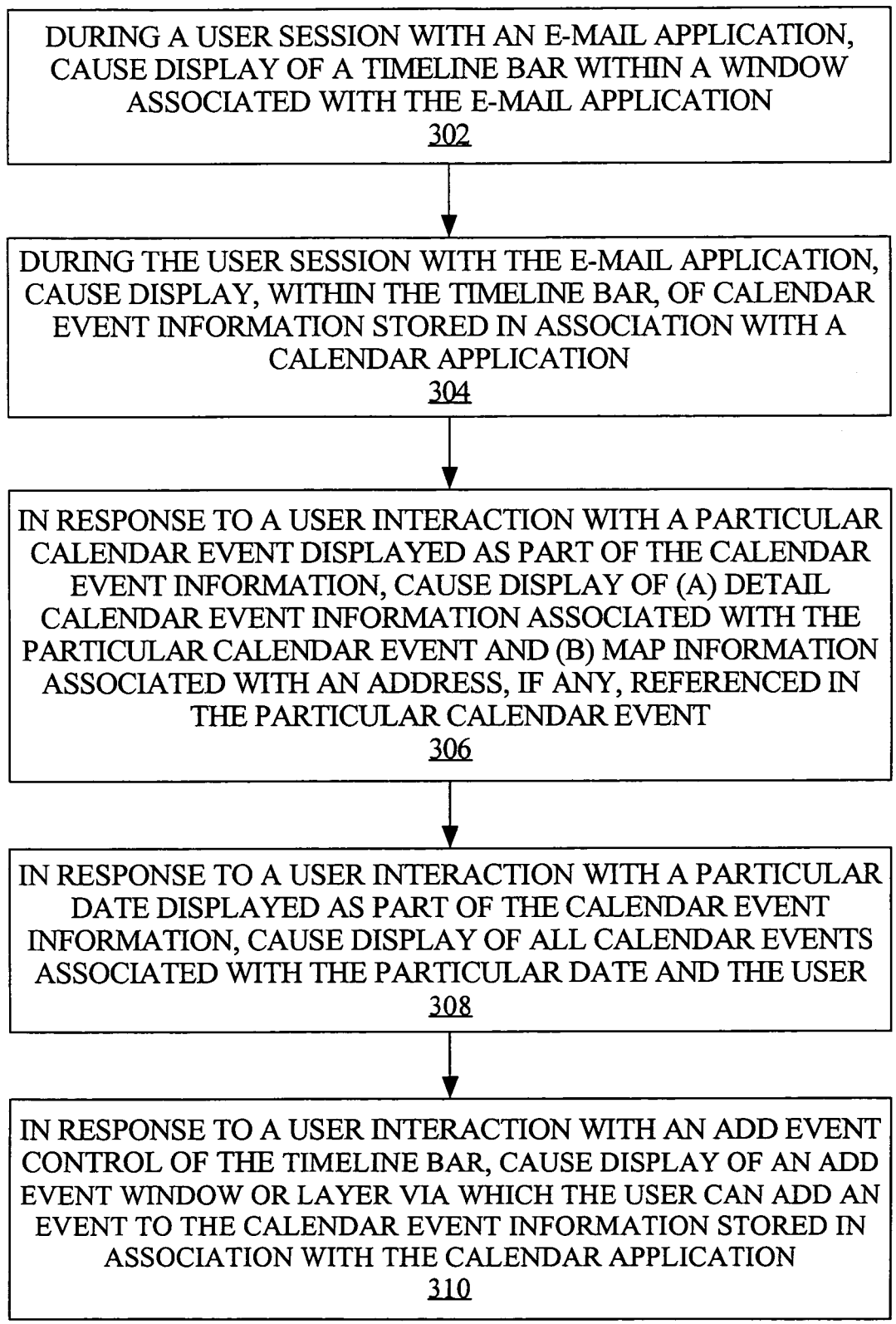
FIG. 3 is a flow diagram that illustrates a method for presenting calendar information embedded within an e-mail window, according to an embodiment of the invention.

FIG. 3 is a flow diagram that illustrates a method for presenting calendar information embedded within an e-mail window, according to an embodiment of the invention. The method depicted in FIG. 3 is a computer and/or machine-implemented method in which a computer or machine performs the method, such as by one or more processors executing instructions. For example, the method may be performed on or by a computer system such as computer system 400 of FIG. 4. Furthermore, the method may be performed by executing instructions constituent to a server-based software application, a client-based software application, a desktop software application, or any combination of the foregoing applications.

At block 302, during a user session with an electronic mail application, a timeline bar is displayed within a window associated with the electronic mail application and, at block 304, calendar event information stored in association with a calendar application is displayed within the timeline bar. Blocks 302 and 304 are depicted separately in FIG. 3 but are not necessarily separate independent steps because the timeline bar (e.g., timeline bar 102 of FIGS. 1 and 2) can be invoked and displayed simultaneously with display of the corresponding calendar event information in the timeline bar. Furthermore, the electronic mail application and the calendar application may be implemented as separate applications or may be implemented as modules integrated within the same application.

At block 306, in response to a user interaction with a particular calendar event displayed in the timeline bar as part of the calendar event information, (a) detail calendar event information associated with the particular calendar event is displayed and (b) map information associated with an address referenced in the particular calendar event is displayed, if an address is in fact referenced in particular calendar event. For example, clicking on or hovering over an event displayed in content area 202 (FIG. 2) of timeline bar 102 results in the presentation of a window or layer showing details about the event as well as a map to the location of the event, if applicable.

At block 308, in response to a user interaction with a particular date displayed in the timeline bar as part of the calendar event information, all the calendar events associated with the particular date and with the user are displayed. For example, clicking on or hovering over a date displayed in content area 202 (FIG. 2) of timeline bar 102 results in the presentation of a window or layer showing all the user's calendar events for that day.

At block 310, in response to a user interaction with an add event control displayed in the timeline bar, an add event dialog box is displayed, via which the user can add an event to the calendar event information stored in association with the calendar application or module. For example, clicking on add event control 210 (FIG. 2) of timeline bar 102 results in the presentation of an add event dialog box for use in adding new calendar events for the user.

The foregoing method illustrated in FIG. 3 provides an example of some of the functionality that can be invoked and exercised via the compact timeline bar 102 (FIGS. 1 and 2) embedded within an e-mail application. However, the method illustrated in FIG. 3 is not intended to be an exhaustive example of all the functionality that can be implemented in conjunction with, and that can be invoked and exercised via, timeline bar 102 or a similar embedded timeline mechanism.

Hardware Overview

Figure 4:
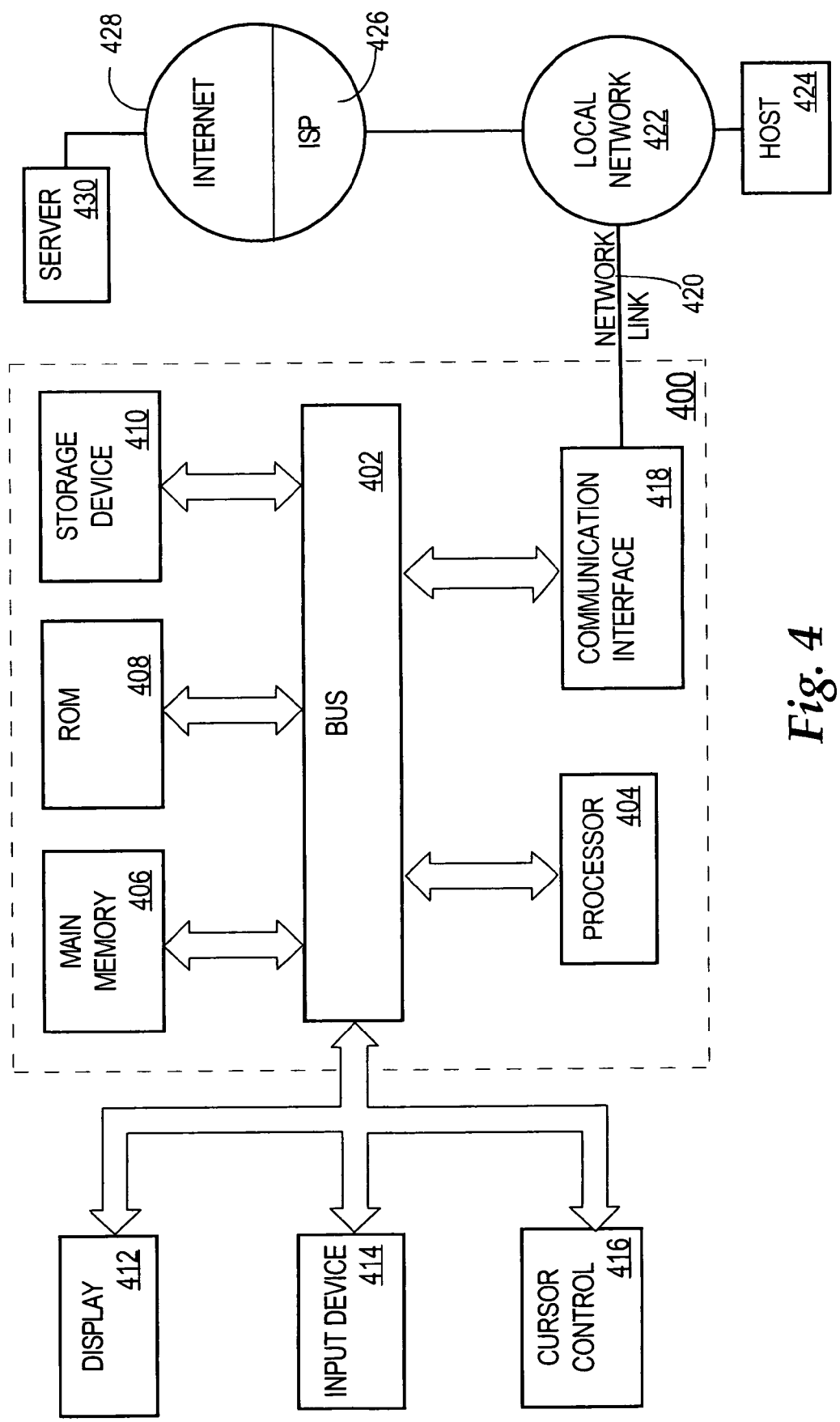
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Alternative embodiments of the invention are described throughout the foregoing specification, and in locations that best facilitate understanding the context of the embodiments. Furthermore, the invention has been described with reference to specific embodiments thereof. It will, however, be evident that various modifications and changes may be made thereto without departing from the broader spirit and scope of the invention.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising:

during a user session with an electronic-mail application that displays (a) a message list that lists a plurality of electronic mails and (b) calendar event information stored in association with a calendar application, detecting that a user has highlighted a first electronic-mail in said message list by selecting a first list item shown in said message list;

parsing said first electronic-mail and determining that said first electronic-mail contains calendar event information; and in response to determining that said first electronic-mail contains calendar event information, and in response to said user highlighting said first electronic-mail in said message list by selecting said first list item shown in said message list, causing an "add event" control of said electronic-mail application to be visually displayed in a first manner;
wherein causing the visual appearance of said "add event" control to change is performed without automatically creating a new event in said calendar application;
during the user session with the electronic-mail application, detecting that the user has highlighted a second electronic-mail in the message list by selecting a second list item shown in said message list;
parsing said second electronic-mail and determining that said second electronic-mail does not contain calendar event information; and
in response to determining that said second electronic-mail does not contain calendar event information, and in response to said user highlighting said second electronic-mail in said message list, causing the "add event" control of the electronic-mail application to be visually displayed in a second manner that is different from the first manner;
wherein the electronic-mail application concurrently displays the message list, at least a portion of a timeline bar, and within said timeline bar, the calendar event information stored in association with said calendar application, and further comprising:
detecting that said user has performed a drag-and-drop action that drags said first electronic-mail from said message list onto said portion of said timeline bar;
in response to detecting that the user has performed a drag-and-drop action that drags the electronic-mail from said message list onto said portion of said timeline bar, performing the steps of:
parsing said electronic-mail; and
automatically creating a new calendar event based on information parsed from said electronic-mail, wherein
detecting that said user has performed said drag-and-drop action,
parsing said first electronic-mail, and
automatically creating said new calendar event are performed by one or more computing devices.

2. The method of claim 1, wherein said portion of said timeline bar comprises a navigator icon, and further comprising:
in response to a user interaction with said navigator icon, causing concurrent display of a calendar dialog box via which the user can select a date for which calendar event information is displayed in said portion of said timeline bar.

3. The method of claim 2, further comprising:
in response to a user interaction with a particular date displayed in said calendar dialog box, causing concurrent display of all calendar events associated with said particular date and said user.

4. The method of claim 3, wherein causing concurrent display of all calendar events for said particular date for said user is in response to said user hovering a cursor over said particular date.

5. The method of claim 3, further comprising:
in response to a user interaction with a particular calendar event displayed, causing concurrent display of an event editor configured to allow editing of said particular calendar event.

6. The method of claim 2, further comprising:
in response to a user interaction with the current date displayed in said calendar dialog box, causing concurrent display of weather information for said current date.

7. The method of claim 2, further comprising:
in response to a user interaction with a particular calendar event date displayed in said calendar dialog box, causing concurrent display of an add event dialog box with the particular date selected.

8. The method of claim 1, further comprising:
in response to a user interaction with a particular calendar event displayed as part of said calendar event information, causing concurrent display of detail calendar event information associated with said particular calendar event.

9. The method of claim 8, wherein causing concurrent display of detail calendar event information associated with said particular calendar event is in response to said user hovering a cursor over said particular calendar event.

10. The method of claim 1, further comprising:
in response to a user interaction with a particular calendar event displayed as part of said calendar event information, causing concurrent display of map information associated with an address referenced in said particular calendar event.

11. The method of claim 10, wherein causing concurrent display of map information associated with an address referenced in said particular calendar event is in response to said user hovering a cursor over said particular calendar event.

12. The method of claim 10, further comprising:
in response to a user interaction with said map information, linking to a map application.

13. The method of claim 1, further comprising:
in response to a user interaction with a particular date displayed as part of said calendar event information, causing concurrent display of all calendar events associated with said particular date and said user.

14. The method of claim 13, wherein causing concurrent display of all calendar events associated with said particular date and said user is in response to said user hovering a cursor over said particular date.

15. The method of claim 1, wherein said portion of said timeline bar comprises a control icon for displaying calendar event information associated with events scheduled for before said calendar event information currently displayed in said portion of said timeline bar.

16. The method of claim 1, wherein said portion of said timeline bar comprises a control icon for displaying calendar event information associated with events scheduled for after said calendar event information currently displayed in said portion of said timeline bar.

17. The method of claim 1, wherein said portion of said timeline bar is configured to display calendar event information corresponding to the current time.

18. The method of claim 1, further comprising:
automatically refreshing said calendar event information displayed in said portion of said timeline bar based on the current time.

19. The method of claim 1, wherein said calendar event information displayed in said portion of said timeline bar comprises at least part of a continuous string of calendar events.

20. The method of claim 1, further comprising:
in response to a user click/hold/drag action with said calendar event information, causing scrolling of said calendar event information in a direction in which said user drags said calendar event information.

21. The method of claim 1, further comprising: causing concurrent display of a particular icon in association with a particular calendar event, wherein said particular icon indicates that said particular calendar event is a recurring event.

22. The method of claim 1, further comprising:
momentarily displaying, over said portion of said timeline bar, a reminder associated with calendar event information stored in association with the calendar application.

23. The method of claim 1, further comprising:
momentarily displaying, over said portion of said timeline bar, a notification associated with an instant messaging application.

24. The method of claim 1, further comprising: sending to a browser a single webpage that has both the message list and the portion of the timeline bar.

25. The method of claim 1, further comprising:
in response to a user click/hold/drag action with said portion of said timeline bar, causing said portion of said timeline bar to relocate within said electronic-mail window at or near a position at which said user dragged said portion of said timeline bar.

26. The method of claim 1, wherein said portion of said timeline bar corresponds to a particular date, and wherein the new calendar event is an event on said date.

27. The method of claim 1, further comprising:
causing concurrent display of an add event dialog box with calendar event information associated with said new calendar event.

28. One or more non-transitory storage media storing instructions which, when executed by one or more computing devices, cause performance of a method comprising:
during a user session with an electronic-mail application that displays (a) a message list that lists a plurality of electronic mails and (b) calendar event information stored in association with a calendar application, detecting that a user has highlighted a first electronic-mail in said message list by selecting a first list item shown in said message list;
parsing said first electronic-mail and determining that said first electronic-mail contains calendar event information; and
in response to determining that said first electronic-mail contains calendar event information, and in response to said user highlighting said first electronic-mail in said message list by selecting said first list item shown in said message list, causing an "add event" control of said electronic-mail application to be visually displayed in a first manner;
wherein causing the visual appearance of said "add event" control to change is performed without automatically creating a new event in said calendar application;
during the user session with the electronic-mail application, detecting that the user has highlighted a second electronic-mail in the message list by selecting a second list item shown in said message list;
parsing said second electronic-mail and determining that said second electronic-mail does not contain calendar event information; and
in response to determining that said second electronic-mail does not contain calendar event information, and in response to said user highlighting said second electronic-mail in said message list, causing the "add event" control of the electronic-mail application to be visually displayed in a second manner that is different from the first manner;
wherein the electronic-mail application concurrently displays the message list, at least a portion of a timeline bar, and within said timeline bar, the calendar event information stored in association with said calendar application, and further comprising:
detecting that said user has performed a drag-and-drop action that drags said first electronic-mail from said message list onto said portion of said timeline bar;
in response to detecting that the user has performed a drag-and-drop action that drags the electronic-mail from said message list onto said portion of said timeline bar, performing the steps of:
parsing said electronic-mail; and
automatically creating a new calendar event based on information parsed from said electronic-mail, wherein
detecting that said user has performed said drag-and-drop action,
parsing said first electronic-mail, and
automatically creating said new calendar event are performed by one or more computing devices.

29. The one or more non-transitory storage media storing instructions of claim 28 wherein: said portion of said timeline bar comprises a navigator icon; and the method further comprises:
in response to a user interaction with said navigator icon, causing concurrent display of a calendar dialog box via which the user can select a date for which calendar event information is displayed in said portion of said timeline bar;
in response to a user interaction with a particular date displayed in said calendar dialog box, causing concurrent display of all calendar events associated with said particular date and said user; and
in response to a user interaction with a particular calendar event displayed, causing concurrent display of an event editor configured to allow editing of said particular calendar event.

30. The one or more non-transitory storage media storing instructions of claim 28 wherein: said portion of said timeline bar comprises a navigator icon; and the method further comprises:
in response to a user interaction with a particular date displayed as part of said calendar event information, causing concurrent display of all calendar events associated with said particular date and said user.

* * * * *